US008508853B2

(12) United States Patent
Amano

(10) Patent No.: US 8,508,853 B2
(45) Date of Patent: Aug. 13, 2013

(54) PROJECTION LENS AND PROJECTION-TYPE DISPLAY APPARATUS

(75) Inventor: Masaru Amano, Saitama (JP)

(73) Assignee: FUJIFILM Corporation, Tokyo (JP)

(*) Notice: Subject to any disclaimer, the term of this patent is extended or adjusted under 35 U.S.C. 154(b) by 339 days.

(21) Appl. No.: 12/862,603

(22) Filed: Aug. 24, 2010

(65) Prior Publication Data
US 2011/0051101 A1 Mar. 3, 2011

(30) Foreign Application Priority Data

Sep. 3, 2009 (JP) .............................. P2009-203725

(51) Int. Cl.
G02B 9/60 (2006.01)
G02B 13/18 (2006.01)
G02B 9/34 (2006.01)

(52) U.S. Cl.
USPC .......... 359/649; 359/650; 359/714; 359/715; 359/770; 359/781; 359/782; 359/783

(58) Field of Classification Search
USPC ................ 359/680–682, 749–753, 691, 714, 359/715, 770, 781, 782, 783
See application file for complete search history.

(56) References Cited

U.S. PATENT DOCUMENTS

| 4,059,344 | A | 11/1977 | Yamasita |
| 5,774,279 | A | 6/1998 | Kawano et al. |
| 5,822,128 | A | 10/1998 | Sekine |
| 7,450,320 | B2 * | 11/2008 | Kang et al. ................ 359/691 |
| 7,515,351 | B2 * | 4/2009 | Chen et al. ................ 359/680 |
| 7,679,832 | B1 * | 3/2010 | Wang et al. ................ 359/650 |
| 2004/0012859 | A1 | 1/2004 | Minefuji |

FOREIGN PATENT DOCUMENTS

| JP | 51-049734 A | 4/1976 |
| JP | 09-113799 A | 5/1997 |
| JP | 9-318876 A | 12/1997 |
| JP | 2001-124988 A | 5/2001 |
| JP | 2004-053751 A | 2/2004 |

* cited by examiner

Primary Examiner — Scott J Sugarman
(74) Attorney, Agent, or Firm — Birch, Stewart, Kolasch & Birch, LLP

(57) ABSTRACT

A projection lens consists of first and second les groups and a stop. The first lens group is formed of a negative lens. The second lens group is formed of three positive lenses and a negative lens. The stop is disposed between the first and second lens groups or in the second lens group. The first and second lens groups are arranged in order from a magnification side. The projection lens is telecentric on a reduction side. The projection lens is configured to satisfy the following conditional expressions (1) and (2):

$$1.0 \leq f_{2h}/f \leq 5.0 \tag{1}$$

$$-2.5 \leq f_1/f \leq -0.8 \tag{2}$$

where f2h is a focal length of an aspheric lens of at least one of the first and second positive lenses of the second lens group, f is a focal length of the whole system, and f1 is a focal length of the first lens group.

6 Claims, 6 Drawing Sheets

EXAMPLE 1

EXAMPLE 1

EXAMPLE 1

EXAMPLE 1

EXAMPLE 2

EXAMPLE 2

EXAMPLE 3

EXAMPLE 3

EXAMPLE 4

EXAMPLE 4

FIG. 5  EXAMPLE 1
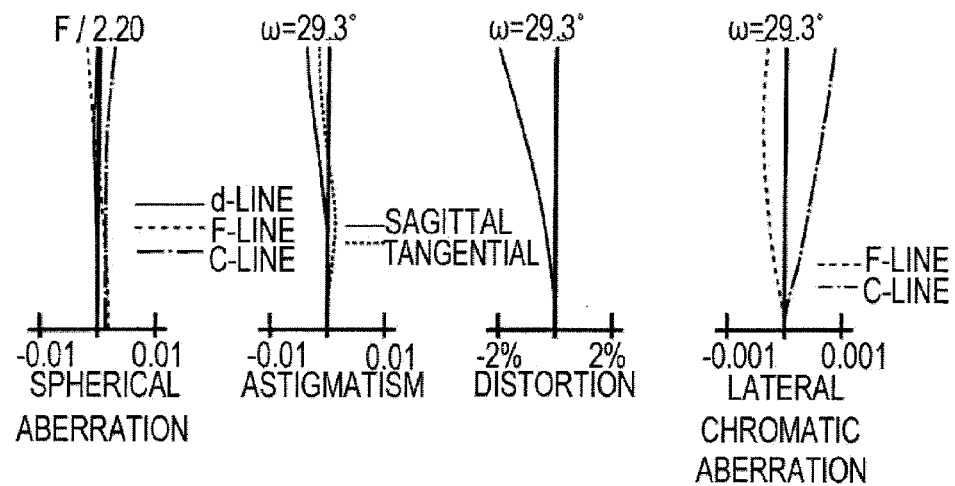
FIG. 6  EXAMPLE 2
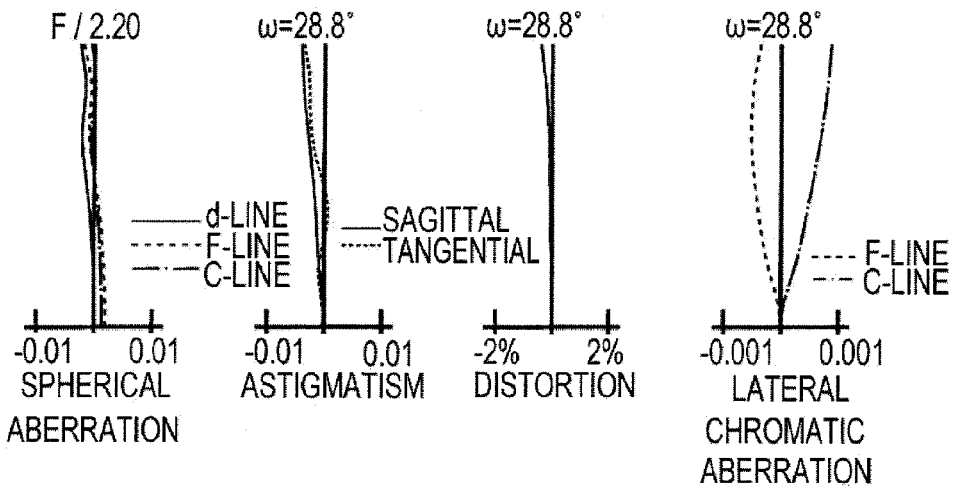
FIG. 7  EXAMPLE 3
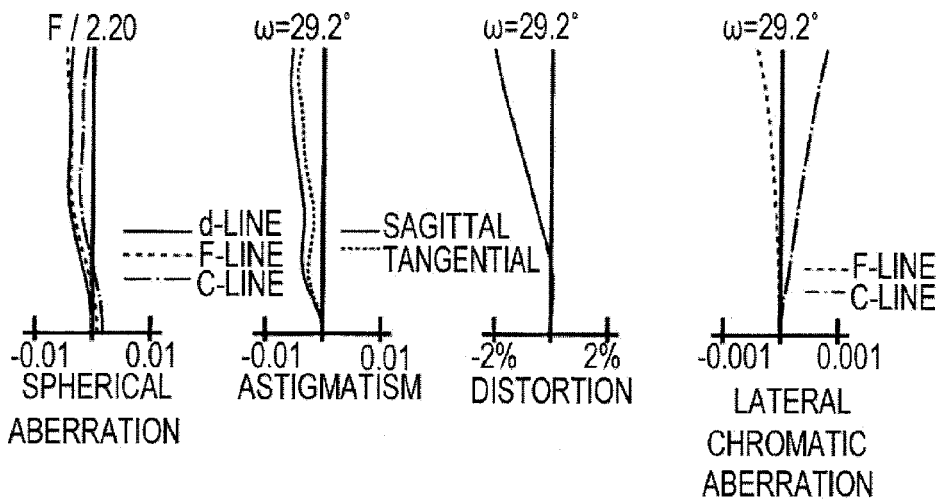

EXAMPLE 4

PROJECTION LENS AND PROJECTION-TYPE DISPLAY APPARATUS

CROSS-REFERENCE TO RELATED APPLICATIONS

This application is based upon and claims the benefit of priority from the Japanese Patent Application No. 2009-203725 filed on Sep. 3, 2009; the entire contents of which are incorporated herein by reference.

BACKGROUND OF THE INVENTION

1. Field of the Invention

The present invention relates to a projection lens provided in the projector apparatuses and the like. In particular, the invention relates to a fixed focus projection lens and a projection-type display apparatus suitable for projecting an original image, which is formed by rays optically modulated by a light valve such as a liquid crystal display device or a micro mirror device, onto a screen in an enlarged manner.

2. Description of the Related Art

So-called front projection-type projector apparatuses for projecting an image on a screen in front of the apparatuses have come into widespread use for various applications such as school education, training in corporations, and presentations.

As projections lenses provided in such projector apparatuses, there are projection lenses centered on functions for improvement in optical performance, an increase in angle of view, an increase in magnification, and the like, and on the other hand there are more compact and lower-cost projection lenses.

In order to achieve compactness and low cost, generally fixed focus lenses, in which the zoom function is removed, are used, or the number of lenses is reduced. For example, the later-described JP-A-09-318876 and JP-A-2001-124988 proposed fixed focus projection lenses each of which has five lens elements.

SUMMARY OF THE INVENTION

In recent years, in accordance with an increase in precision of light modulation devices (light valves) and the like, there is a demand for a faster and higher-performance projection lens even in the projection lenses that achieves reduction in cost by reducing the number of lenses.

Since the projection lens disclosed in the above JP-A-09-318876 is a very slow projection lens of which the F number is 4, there is a problem particularly in the speed of the lens. In the projection lens disclosed in the above JP-A-2001-124988, the F number is 2.8, and thus the speed of lens is improved, but does not meet recent demand. In addition, also with a view to aberration correction, there is a problem in that variation in tangential astigmatism is large.

As a method for satisfactorily correcting aberrations while minimizing the number of lenses, it is conceivable to use aspheric lenses. However, the glass aspheric lenses are expensive, and thus the method is inappropriate for the demand to reduce cost. In contrast, the plastic aspheric lenses have cost advantage as compared with the glass aspheric lenses. However, in a case where the plastic aspheric lenses are employed in projection lenses used under high temperature circumstances, there is a concern in that the focal length of the plastic lens is changed by temperature change and this causes out-of-focus effect. For this reason, it is necessary to sufficiently consider a countermeasure therefor.

Further, there are projection lenses provided in the projector apparatuses in which the transmissive or reflective liquid crystal display device or the digital micro mirror device (DMD), produced by Texas Instrument Co., is used as a light valve. For the above projection lenses, it is necessary to have a back focal length appropriate for arrangement of the color synthesis unit and the like, and to be telecentric on the reduction side (the light valve side). Accordingly, there is a great task to achieve compactness while satisfying the above-mentioned demands within a small number of lenses.

In view of the above situation, one embodiment of the invention provides a projection lens capable of securing an appropriate back focal length and telecentricity on the reduction side and satisfactorily correcting various aberrations with a high speed while having a compact configuration with a small number of lenses. In addition, tone embodiment of the invention provides a projection-type display apparatus having the projection lens.

According to an embodiment of the invention, a projection lens consists of a first lens group, a second lens group and a stop. The first lens group is formed of a single negative lens. The second lens group is formed of three positive lenses and a single negative lens. The stop is disposed between the first lens group and the second lens group or in the second lens group. The first lens group, which is formed of the single negative lens, and the second lens group, which is formed of the three positive lenses and the single negative lens, are arranged in order from a magnification side. The projection lens is telecentric on a reduction side. The single negative lens of the first lens group is formed to have at least one aspheric surface. In the second lens group, first and second positive lenses, each of which has a surface convex toward the reduction side, are arranged in order from the magnification side. At least one of the first and second positive lenses is formed as an aspheric lens. The following conditional expressions (1) and (2) are satisfied:

$$1.0 \leq f_{2h}/f \leq 5.0 \qquad (1), \text{ and}$$

$$-2.5 \leq f_1/f \leq -0.8 \qquad (2),$$

where $f_{2h}$ is a focal length of the aspheric lens of the first and second positive lenses of the second lens group, f is a focal length of the whole system, and $f_1$ is a focal length of the first lens group.

In one embodiment of the invention, the single negative lens of the first lens group and the aspheric lens of the first and second positive lenses of the second lens group, may be made of plastic.

Further, the following conditional expression (3) may be satisfied:

$$-1.8 \leq f_1/f_2 \leq -0.2 \qquad (3),$$

where $f_2$ is a focal length of the second lens group.

Furthermore, the following conditional expression (4) may be satisfied:

$$1.0 \leq Bf/f \qquad (4),$$

where

Bf is a back focal length of the whole system.

Furthermore, the following conditional expression (5) may be satisfied:

$$v_n \leq 30 \qquad (5)$$

where $v_n$ is an Abbe number of the single negative lens of the second lens group at the d-line.

Furthermore, the following conditional expression (6) may be satisfied:

$$0.2 \leq D_s/D \leq 0.5 \quad (6),$$

where $D_s$ is a distance on an optical axis from the reduction side surface of the single negative lens of the first lens group to the stop, and D is a total length of the projection lens.

Furthermore, according to another embodiment of the invention, a projection-type display apparatus includes a light source, a light valve, an illumination optical unit, and the above-mentioned projection lens according to the embodiment of the invention. The illumination optical unit guides rays originated from the light source into the light valve. In the apparatus, the rays originated from the light source are optically modulated by the light valve, and are projected on a screen by the projection lens.

Furthermore, the "magnification side" means a projected side (the screen side), and even in the case of reduction projection, the screen side is referred to as the magnification side for convenience of description. On the other hand, the "reduction side" means an original image display region side (the light valve side), and even in the case of reduction projection, the light valve side is referred to as the reduction side.

Further, the positive or negative sign of the refractive power of the aspheric lens means the positive or negative sign of the refractive power thereof on the optical axis.

According to the embodiment of the invention, the projection lens has the following advantages. First, by adopting the configuration in which the first lens group is formed of the single negative lens, it is possible to satisfactorily correct distortion in the first lens group. Second, by adopting the configuration in which at least one of the first and second positive lenses, each disposed in the second lens group and having the surface convex toward the reduction side, is formed as an aspheric lens, it is possible to satisfactorily correct spherical aberration. Further, due to the arrangement of the aspheric lens, it is possible to obtain favorable optical performance with a high speed of the lens while having a compact configuration in which the total number of lenses is five.

Furthermore, by adopting the configuration in which the conditional expressions (1) and (2) are satisfied, it is possible to improve the balance in refractive power between the negative aspheric lens constituting the first lens group and the positive aspheric lenses constituting the second lens group. Therefore, even when the aspheric lens is made of plastic, it is possible to cancel the positive or negative change in the refractive power thereof caused by temperature change. Thus, it is possible to obtain a fast projection lens capable of reducing the out-of-focus effect, securing an appropriate back focal length, and achieving compactness while satisfactorily correcting various aberrations such as spherical aberration, astigmatism, and image field curvature. Also, it is possible to obtain a projection-type display apparatus having the projection lens.

BRIEF DESCRIPTION OF THE DRAWINGS

FIG. 5 is a diagram illustrating various aberrations of the projection lens according to Example 1;

FIG. 6 is a diagram illustrating various aberrations of the projection lens according to Example 2;

FIG. 7 is a diagram illustrating various aberrations of the projection lens according to Example 3;

DESCRIPTION OF THE PREFERRED EMBODIMENTS

Figure 1A:
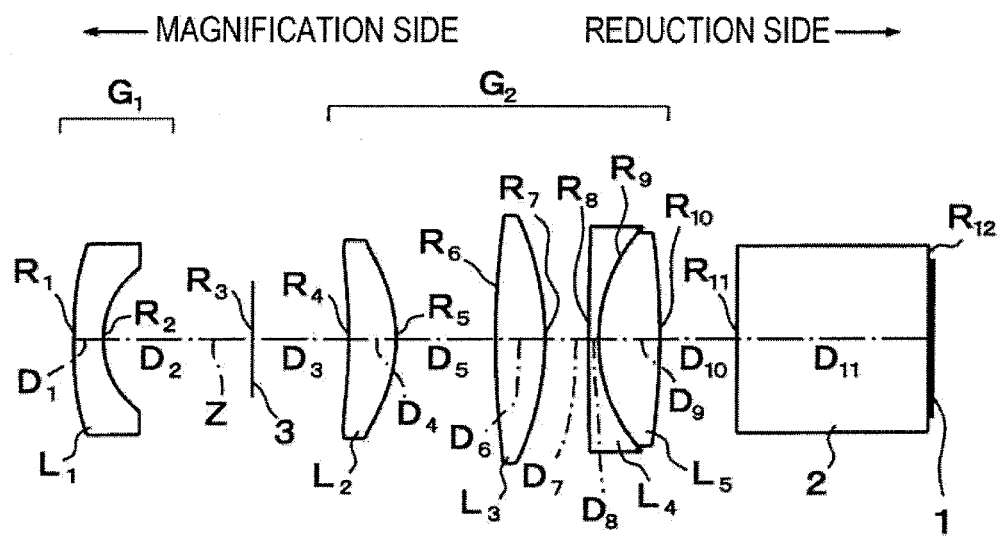
FIG. 1A is a detailed configuration diagram of a projection lens according to Example 1.

Hereinafter, an embodiment of the invention will be described with reference to the accompanying drawings. In the following description, referring to FIG. 1 which is a lens configuration diagram of Example 1 to be described later, the projection lens is given as a representative example. In addition, the reference sign Z in the drawing represents an optical axis.

Figure 1B:
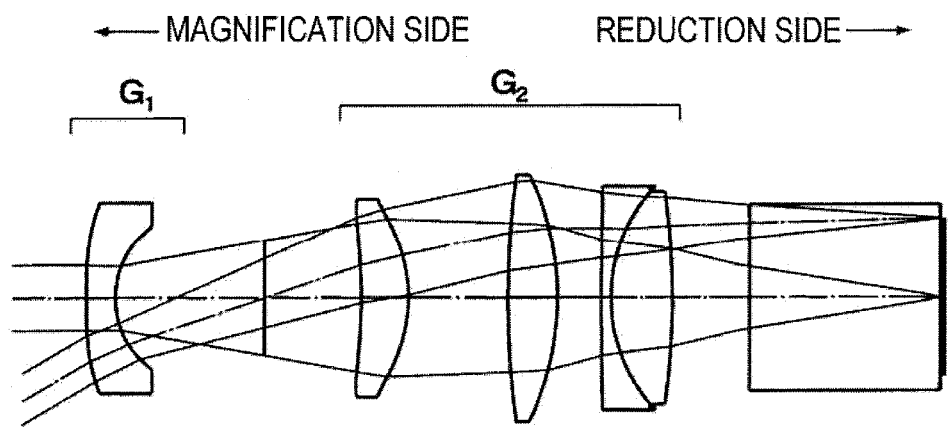
FIG. 1B is a ray tracing diagram of the projection lens according to Example 1.

As shown in FIG. 1, the projection lens according to the embodiment is configured so that, in order from the magnification side (the screen side), a first lens group $G_1$, which has a negative refractive power, and a second lens group $G_2$, which has a positive refractive power, are arranged. The projection lens is a fixed focus lens including a total of five lenses (first lens $L_1$ to fifth lens $L_5$), in which an aperture stop 3 is disposed between the first lens group $G_1$ and the second lens group $G_2$. In addition, the projection lens is configured to be telecentric on the reduction side.

Furthermore, the focusing is generally performed by moving the entire lens groups along the optical axis Z (the entire moving system). However, it is possible to perform the focusing by moving some lens groups along the optical axis Z.

Further, in the projection lens according to the embodiment, rays, which are emitted from the right side of the system in FIG. 1 and contain image information displayed on an image display surface 1 of a light valve, are incident to the projection lens through a glass block 2 (including a filter section), and are projected to a left side thereof to magnify the image by the projection lens. In FIG. 1, only the image display surface 1 of the single light valve is illustrated for convenience of explanation, but in some projection type display apparatuses, there are arranged three light valves for three primary color rays into which rays emitted from a light source are separated by using a color separation optical system so that the device can display a full-color image (refer to FIG. 9). By disposing a color synthesis unit such as a cross dichroic prism (which may be a glass block as described in some examples) on the glass block 2, it is possible to synthesize the three primary color rays.

Further, in the embodiment, the aperture stop 3 is disposed between the first lens group $G_1$ and the second lens group $G_2$. However, the aperture stop 3 may be disposed in the second lens group $G_2$ (for example, similarly to Example 4 shown in FIG. 4, between the second lens $L_2$ and the third lens $L_3$).

The first lens group $G_1$ is formed of only the first lens $L_1$ as a single negative lens, and the first lens $L_1$ is formed as a plastic lens of which at least one surface (both surfaces in the embodiment) is formed to be aspheric.

The second lens group $G_2$ includes, in order from the magnification side: three positive lenses (second lens $L_2$, third lens $L_3$ and fifth lens $L_5$) including the first and second positive lenses (the second lens $L_2$ and the third lens $L_3$) each of which has a surface convex toward the reduction side; and a single negative lens (the fourth lens $L_4$). At least one of the first and second positive lenses (in the embodiment, the first positive lens (the second lens $L_2$)) is formed as a plastic lens of which at least one surface (both surfaces in the embodiment) is formed to be aspheric. Further, the fourth lens $L_4$ and the fifth lens $L_5$ are cemented to each other, and are thereby formed as a cemented lens. Furthermore, the shape of the aspheric surface is represented by the following aspheric surface expression.

$$Z = \frac{Y^2/R}{1 + \sqrt{1 - K \times Y^2/R^2}} + \sum_{i=3}^{16} A_i Y^j \qquad \text{Numerical Expression 1}$$

where

Z is the length of a perpendicular line from the point on the aspheric surface, which is apart from the optical axis at the distance Y, to the tangential plane (the plane perpendicular to the optical axis) of the vertex of the aspheric surface, Y is the distance from the optical axis, R is the radius of curvature near the optical axis of the aspheric surface, K is the eccentricity, and $A_i$ is the aspheric coefficient (i=3 to 16).

Furthermore, the projection lens according to the embodiment is configured to satisfy the following conditional expressions (1) and (2).

$$1.0 \leq f_{2h}/f \leq 5.0 \qquad (1), \text{and}$$

$$-2.5 \leq f_1/f \leq -0.8 \qquad (2),$$

where $f_{2h}$ is the focal length of the aspheric lens of the first and second positive lenses (the second lens $L_2$ and the third lens $L_3$) of the second lens group $G_2$, f is the focal length of the whole system, and $f_1$ is the focal length of the first lens group $G_1$.

The conditional expression (1) is for defining the refractive power of the aspheric lens in the second lens group $G_2$. When the result value of the conditional expression (1) is less than the lower limit thereof, the positive refractive power of the aspheric lens in the second lens group $G_2$ becomes too large, and thus it becomes difficult to suppress occurrence of the out-of-focus effect due to temperature change. In contrast, when the result value of the conditional expression (1) is more than the upper limit thereof, the positive refractive power of the aspheric lens in the second lens group $G_2$ becomes small, and thus it becomes difficult to satisfactorily correct spherical aberration and astigmatism. Accordingly, in order to satisfactorily correct such aberrations, it may be inevitable that the number of lenses increases.

The conditional expression (2) is for satisfactorily correcting aberrations and securing an appropriate back focal length. When the result value of the conditional expression (2) is less than the lower limit thereof, the negative refractive power of the aspheric lens (the first lens $L_1$) in the first lens group $G_1$ becomes too small. Thus, the back focal length becomes short, and it becomes difficult to dispose the color synthesis unit between the projection lens and the light valve. In contrast, when the result value of the conditional expression (2) is more than the upper limit thereof, the negative refractive power of the first lens $L_1$ becomes too large, and thus it becomes difficult to satisfactorily correct the off-axis aberrations such as image field curvature. In addition, the back focal length becomes long, and thus it becomes also difficult to make the whole system compact.

By satisfying all the conditional expressions (1) and (2), it is possible to cancel the positive or negative change in the refractive power thereof caused by temperature change. Even when the aspheric lens is made of plastic, it is possible to suppress the occurrence of the out-of-focus effect. In addition, even when the speed of the lens is secured so that the F number is equal to 2.2, it is possible to satisfactorily correct various aberrations.

Further, it is preferable that the projection lens according to the embodiment should be configured to satisfy the following conditional expressions (3) to (6).

$$-1.8 \leq f_1/f_2 \leq -0.2 \qquad (3).$$

$$1.0 \leq Bf/f \qquad (4),$$

$$v_n \leq 30 \qquad (5), \text{and}$$

$$0.2 \leq D_s/D \leq 0.5 \qquad (6),$$

where $f_2$ is the focal length of the second lens group $G_2$,

Bf is the back focal length of the whole system, $v_n$ is the Abbe number of the single negative lens (fourth lens $L_4$) of the second lens group $G_2$ (the d-line), $D_s$ is the distance on the optical axis Z from the reduction side surface of the single negative lens (the first lens $L_1$) of the first lens group $G_1$ to the aperture stop 3, and D is the total length of the projection lens.

The conditional expression (3) is for defining the ratio of the refractive power of the first lens group $G_1$ to the refractive power of the second lens group $G_2$. When the result value of the conditional expression (3) is less than the lower limit thereof, it is necessary to elongate the space between the first lens group $G_1$ and the second lens group $G_2$, and the diameter of the first lens $L_1$ excessively increases. In contrast, when the result value of the conditional expression (3) is more than the upper limit thereof, it becomes difficult to satisfactorily correct image field curvature.

The conditional expression (4) is for securing the appropriate back focal length. When the result value of the conditional expression (4) is less than the lower limit thereof, the back focal length becomes short. Thus, it becomes difficult to dispose the color synthesis unit between the projection lens and the light valve.

The conditional expression (5) is for defining the Abbe number of the single negative lens (in the embodiment, the fourth lens $L_4$) in the second lens group $G_2$. When the result value of the conditional expression (5) is more than the upper limit thereof, it becomes difficult to satisfactorily correct lateral chromatic aberration.

The conditional expression (6) is for defining the position of the aperture stop 3. When the result value of the conditional expression (6) is less than the lower limit thereof, it becomes difficult to make the whole system compact. In contrast, when the result value of the conditional expression (6) is more than the upper limit thereof, the aperture stop 3 becomes too close to the first lens group $G_1$. As a result, it becomes difficult to correct lateral chromatic aberration, and it is also difficult to satisfactorily correct image field curvature.

Furthermore, it is more preferable that, instead of the conditional expressions (1) to (6), the following conditional expressions (1A) to (6A) should be satisfied. In particular, by setting the result value of the following conditional expression (4A) less than the upper limit, it is possible to shorten the length of the optical system, and it is possible to promote compactness.

$$1.6 \leq f_{2H}/f \leq 3.5 \quad (1A)$$

$$-2.2 \leq f_1/f \leq -1.0 \quad (2A)$$

$$-1.5 \leq f_1/f_2 \leq -0.4 \quad (3A)$$

$$1.1 \leq Bf/f \leq 1.8 \quad (4A)$$

$$v_n \leq 27 \quad (5A)$$

$$0.25 \leq D_s/D \leq 0.45 \quad (6A)$$

According to the projection lens of the embodiment configured as described above, while making the compact configuration in which the number of lenses is five, it is possible to secure an appropriate back focal length and telecentricity on the reduction side, and it is possible to obtain a high speed and excellent optical performance.

Next, an example of the projection-type display apparatus equipped with the above-mentioned projection lens will be described with reference to FIG. 9.

Figure 9:
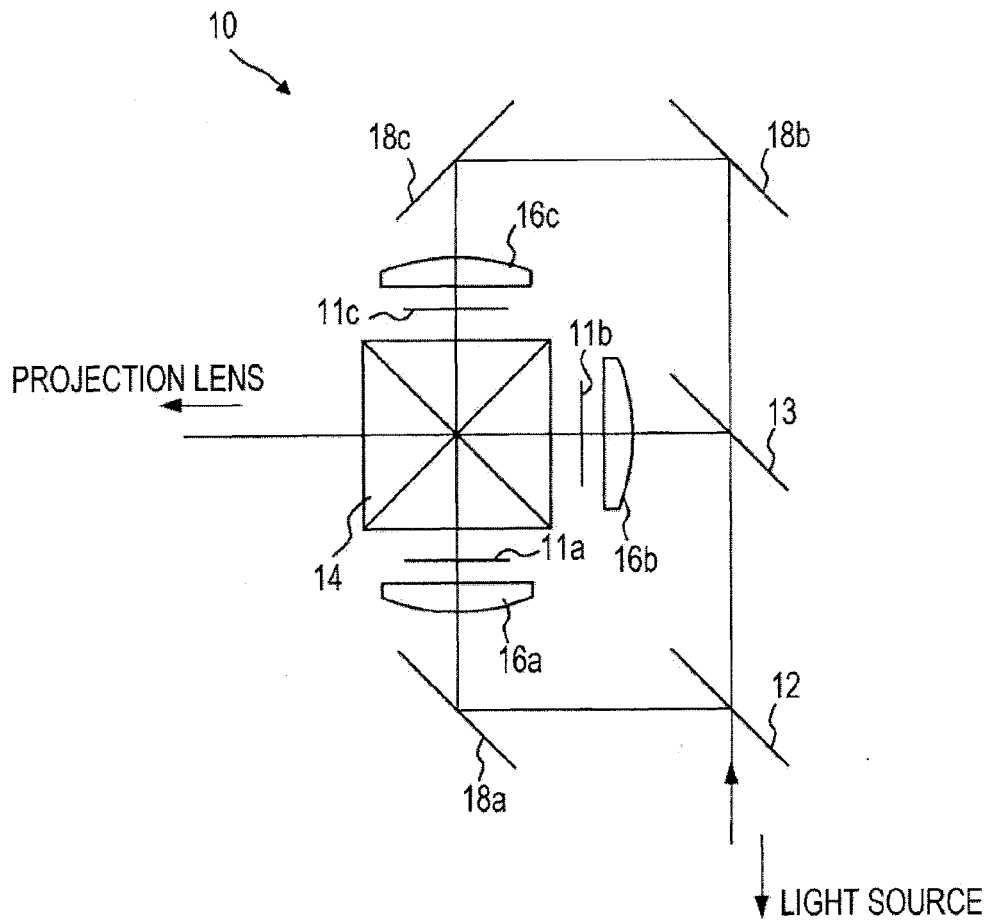
FIG. 9 is a schematic configuration diagram of a projection-type display apparatus according to an embodiment.

The projection-type display apparatus shown in FIG. 9 has transmissive liquid crystal panels 11a to 11c as light valves, and employs the above-mentioned projection lens according to the embodiment as a lens for projecting an enlarged image. Further, between a light source and a dichroic mirror 12, there is disposed an integrator (not shown in the drawing) such as a fly-eye. From the light source, white rays travel through an illumination optical unit, are modulated by being incident on the liquid crystal panels 11a to 11c which correspond to three color rays (G light, B light, R light), are color-synthesized by a cross dichroic prism 14, and are projected by a projection-type variable focus lens 10 on a screen not shown in the drawing. The apparatus includes dichroic mirrors 12 and 13 for color separation, a cross dichroic prism 14 for color synthesis, condenser lenses 16a to 16c, and total reflection mirrors 18a to 18c. By employing the above-mentioned projection lens according to the embodiment, the projection-type display apparatus of the embodiment is able to achieve reduction in size, weight and cost, and is able to maintain high optical performance.

Furthermore, the projection lens according to the embodiments of the invention is not limited to applications serving as a projection lens of the projection-type display apparatus using a transmissive liquid crystal display panel, and may be applied to a projection lens of a device using a different optical modulator such as reflective liquid crystal display panel or DMD.

EXAMPLES

Figure 2A:
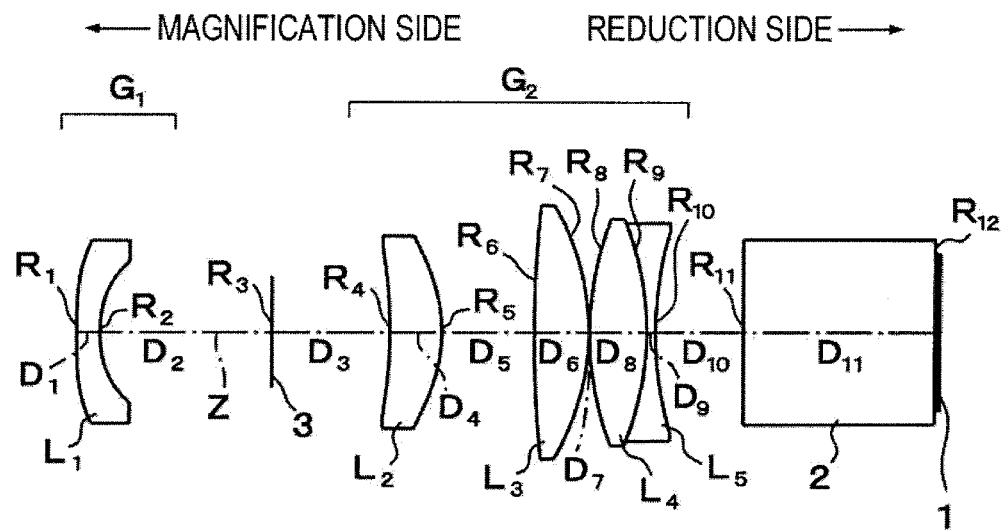
FIG. 2A is a detailed configuration diagram of a projection lens according to Example 2.
Figure 2B:
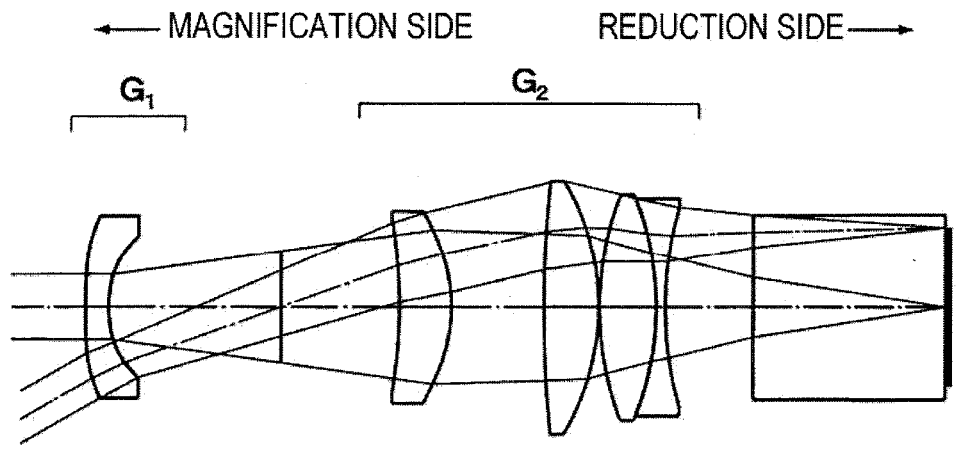
FIG. 2B is a ray tracing diagram of the projection lens according to Example 2.
Figure 3A:
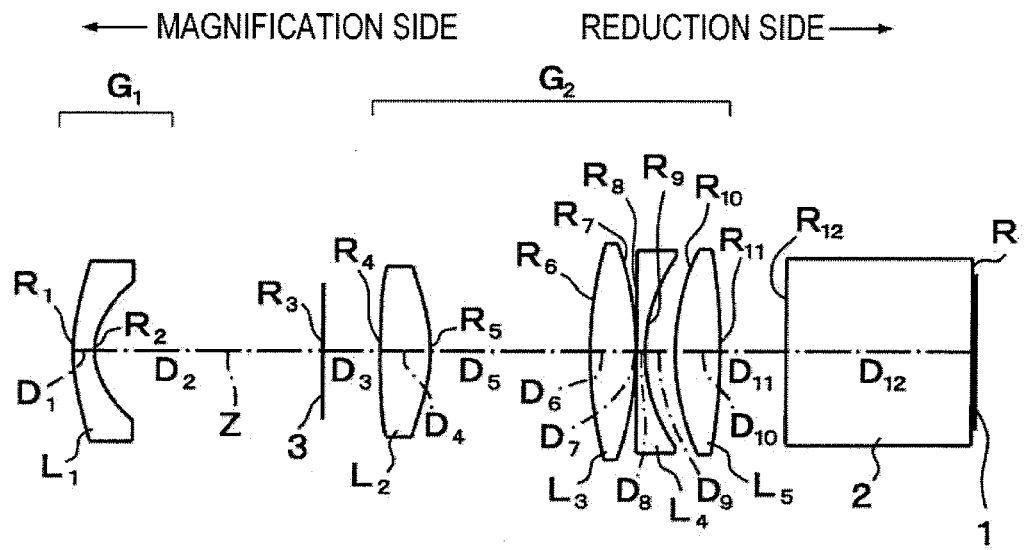
FIG. 3A is a detailed configuration diagram of a projection lens according to Example 3.
Figure 3B:
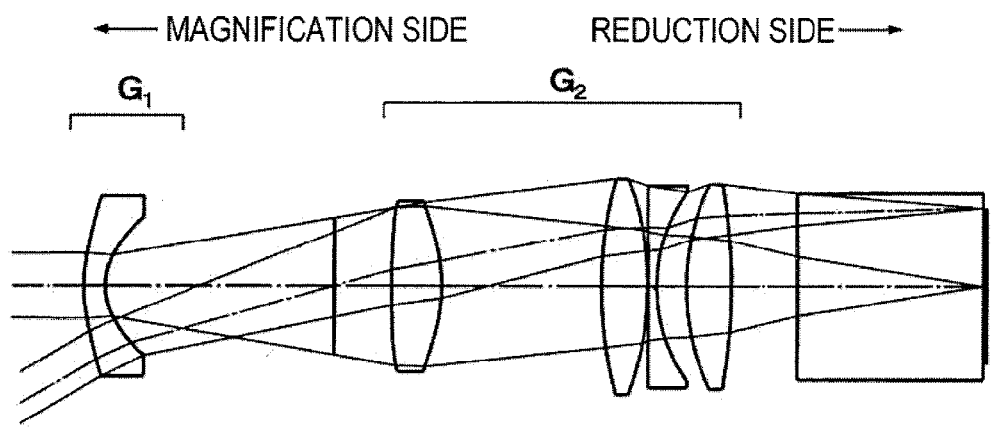
FIG. 3B is a ray tracing diagram of the projection lens according to Example 3.
Figure 4A:
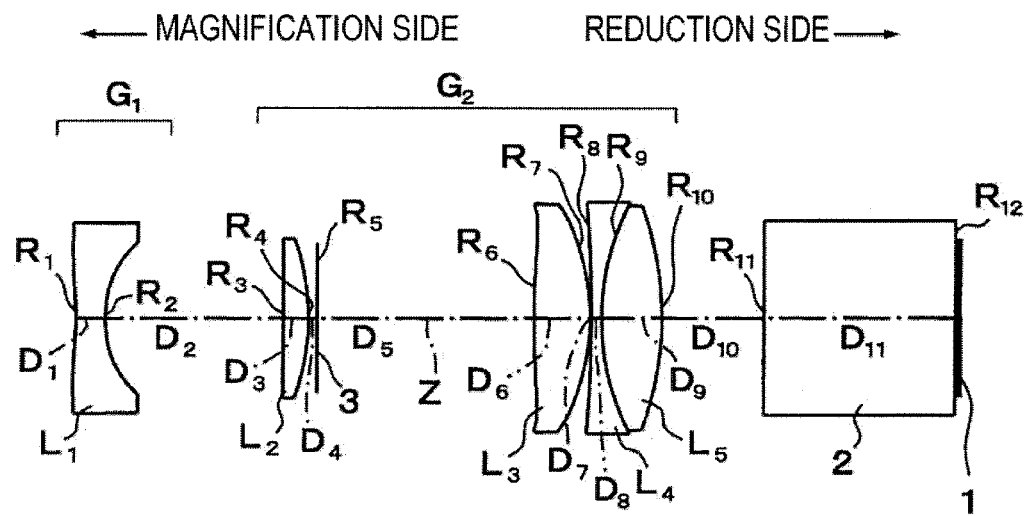
FIG. 4A is a detailed configuration diagram of a projection lens according to Example 4.
Figure 4B:
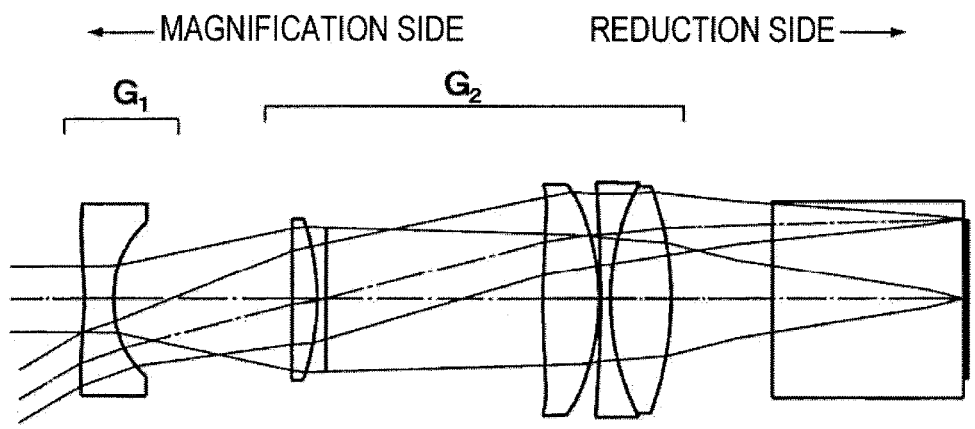
FIG. 4B is a ray tracing diagram of the projection lens according to Example 4.

Hereinafter, specific examples of the projection lens according to the embodiment of the invention will be described. In FIGS. 2 to 4 showing the configurations of Examples 2 to 4, the members having the same effect as Example 1 will be referenced by the same reference numerals and signs used in FIG. 1.

Example 1

The projection lens according to Example 1 is configured as shown in FIG. 1. As described above, the projection lens is configured so that, in order from the magnification side, the first lens group $G_1$, which has a negative refractive power, and the second lens group $G_2$, which has a positive refractive power, are arranged. The projection lens is a fixed focus lens including a total of five lenses (first lens $L_1$ to fifth lens $L_5$), in which the aperture stop 3 is disposed between the first lens group $G_1$ and the second lens group $G_2$. In addition, the projection lens is configured to be telecentric on the reduction side. In addition, on the reduction side thereof, there are also arranged the glass block 2 mostly using a color synthesizing prism and the image display surface 1.

The first lens group $G_1$ includes only the first lens $L_1$ formed as a positive meniscus lens (based on the shape on the optical axis Z), made of plastic, of which a concave surface faces toward the reduction side and of which both surfaces are aspheric.

The second lens group $G_2$ includes, in order from the magnification side: the second lens $L_2$ (the first positive lens) formed as a negative meniscus lens (based on the shape thereof on the optical axis Z), made of plastic, of which a convex surface faces toward the reduction side and of which both surfaces are aspheric; the third lens $L_3$ (the second positive lens) formed as a biconvex lens; the fourth lens $L_4$ (the single negative lens) formed as a negative meniscus lens of which a concave surface faces toward the reduction side; and the fifth lens $L_5$ formed as a biconvex lens. The fourth lens $L_4$ and the fifth lens $L_5$ are cemented to each other, and are thereby formed as a cemented lens.

In Example 1, the upper part of Table 1 shows radii of curvature R of the lens surfaces (those are standardized by setting the focal length of the whole lens system to 1.00; the same in the following Tables), center thicknesses of the lenses and air spaces D between the lenses (those are standardized in the same manner as the radii of curvature R; the same in the following Tables), and refractive indices Nd and Abbe numbers vd of the lenses at the d-line. Furthermore, in the Table 1 and the Tables 2 to 4 to be described later, each numeral corresponding to each of the reference signs R, D, Nd, and vd sequentially increases in order from the magnification side, and each surface having the reference sign * attached to the right side of each surface number is an aspheric surface. Further, the lower part of Table 1 shows respective constants K and $A_3$ to $A_{16}$ corresponding to the respective aspheric surfaces.

TABLE 1

| | FOCAL LENGTH F = 1.00 | | | |
|---|---|---|---|---|
| SURFACE | R | D | Nd | vd |
| 1* | 8.096 | 0.210 | 1.4910 | 57.6 |
| 2* | 0.672 | 1.067 | | |
| 3 (APERTURE STOP) | ∞ | 0.693 | | |

TABLE 1-continued

| | | | | |
|---|---|---|---|---|
| 4* | −4.172 | 0.341 | 1.4910 | 57.6 |
| 5* | −0.982 | 0.714 | | |
| 6 | 6.259 | 0.358 | 1.5891 | 61.1 |
| 7 | −1.891 | 0.312 | | |
| 8 | 30.698 | 0.071 | 1.8052 | 25.4 |
| 9 | 1.101 | 0.441 | 1.5891 | 61.1 |
| 10 | −5.106 | 0.545 | | |
| 11 | ∞ | 1.367 | 1.5163 | 64.1 |
| 12 | ∞ | | | |

ASPHERIC SURFACE COEFFICIENT

| SURFACE NUMBER | | | | | |
|---|---|---|---|---|---|
| 1 | K | $A_3$ | $A_4$ | $A_5$ | $A_6$ |
| | 72.84871 | 1.16940E−02 | 1.08573E+00 | −1.85568E+00 | 1.41030E+00 |
| | $A_7$ | $A_8$ | $A_9$ | $A_{10}$ | $A_{11}$ |
| | 4.44298E−02 | −6.54060E−01 | −2.95484E+00 | 1.88193E+00 | 1.71706E+00 |
| | $A_{12}$ | $A_{13}$ | $A_{14}$ | $A_{15}$ | $A_{16}$ |
| | 1.20443E+01 | 1.37788E+01 | −6.00719E+01 | 1.41939E+00 | 3.59416E+01 |
| 2 | K | $A_3$ | $A_4$ | $A_5$ | $A_6$ |
| | 0.03772 | 3.71050E−02 | 1.62831E+00 | −1.18829E+00 | −1.55294E+00 |
| | $A_7$ | $A_8$ | $A_9$ | $A_{10}$ | $A_{11}$ |
| | 8.85587E+00 | 3.70587E+00 | −7.86069E+00 | −4.44743E+01 | −1.13249E+02 |
| | $A_{12}$ | $A_{13}$ | $A_{14}$ | $A_{15}$ | $A_{16}$ |
| | −1.52762E+02 | 5.10882E+02 | 2.49042E+03 | 4.13159E+03 | −1.58966E+04 |
| 4 | K | $A_3$ | $A_4$ | $A_5$ | $A_6$ |
| | 1.00000 | 0.00000E+00 | 1.16671E−01 | −1.22219E+00 | 3.15742E+00 |
| | $A_7$ | $A_8$ | $A_9$ | $A_{10}$ | |
| | −1.44243E+00 | −6.67673E+00 | 1.22751E+01 | −5.42113E+00 | |
| 5 | K | $A_3$ | $A_4$ | $A_5$ | $A_6$ |
| | 1.00000 | 0.00000E+00 | 1.31549E−01 | −1.97403E−02 | −7.80627E−01 |
| | $A_7$ | $A_8$ | $A_9$ | $A_{10}$ | |
| | 2.35438E+00 | 6.92801E−01 | −7.69505E+00 | 7.38562E+00 | |

*ASPHERIC SURFACE

In addition, Table 5 to be described later shows numerical values corresponding to the respective conditional expressions in Example 1. As shown in Table 5, the projection lens according to Example 1 is configured to satisfy all the conditional expressions (1) to (6) and (1A) to (6A).

FIG. 5 is an aberration diagram illustrating various aberrations (spherical aberration, astigmatism, distortion, and lateral chromatic aberration) of the projection lens according to Example 1. Furthermore, in FIG. 5 and FIGS. 6 to 8 to be described later, the spherical aberration diagrams show aberration curves of rays having wavelengths of the d-line, the F-line, and the C-line, the astigmatism diagrams show aberration curves of a sagittal image plane and a tangential image plane, and the lateral chromatic aberration diagrams show aberration curves of rays of the F-line and the C-line relative to a ray of the d-line.

As can be seen clearly from FIG. 5, the projection lens according to Example 1 has a wide angle as the half angle of view ω is 29.3 degrees, and is fast as the F number is 2.20, in which aberrations are satisfactorily corrected.

Example 2

The projection lens according to Example 2 is configured as shown in FIG. 2. Specifically, the projection lens has substantially the same configuration as that of Example 1 mentioned above. However, there are differences in the following points. First, the first lens $L_1$ constituting the first lens group $G_1$ is formed in a biconcave shape on the optical axis Z. Second, in the second lens group $G_2$, the fourth lens $L_4$ is formed as a biconvex lens, and the fifth lens $L_5$ is formed as a biconcave lens (which constitutes the single negative lens in the second lens group $G_2$) (the fourth lens $L_4$ and fifth lens $L_5$ are cemented to each other similarly to Example 1).

In Example 2, the upper part of Table 2 shows radii of curvature R of the lens surfaces, center thicknesses of the lenses and air spaces D between the lenses, and refractive indices Nd and Abbe numbers vd of the lenses at the d-line. Further, the lower part of Table 2 shows respective constants K and $A_3$ to $A_{16}$ corresponding to the respective aspheric surfaces.

TABLE 2

| FOCAL LENGTH F = 1.00 | | | | |
|---|---|---|---|---|
| SURFACE | R | D | Nd | vd |
| 1* | −60.973 | 0.166 | 1.4910 | 57.6 |
| 2* | 0.951 | 1.231 | | |
| 3 (APERTURE STOP) | ∞ | 0.842 | | |
| 4* | −3.441 | 0.373 | 1.4910 | 57.6 |
| 5* | −1.053 | 0.663 | | |
| 6 | 7.976 | 0.396 | 1.5891 | 61.1 |
| 7 | −1.636 | 0.006 | | |
| 8 | 2.076 | 0.410 | 1.5891 | 61.1 |

TABLE 2-continued

| | | | | |
|---|---|---|---|---|
| 9 | −1.958 | 0.063 | 1.8052 | 25.4 |
| 10 | 2.302 | 0.628 | | |
| 11 | ∞ | 1.366 | 1.5163 | 64.1 |
| 12 | ∞ | | | |

ASPHERIC SURFACE COEFFICIENT

| SURFACE NUMBER | | | | | |
|---|---|---|---|---|---|
| 1 | K | $A_3$ | $A_4$ | $A_5$ | $A_6$ |
| | −884.20352 | 2.90659E−02 | 1.91407E+00 | −2.76671E+00 | 8.99024E−01 |
| | $A_7$ | $A_8$ | $A_9$ | $A_{10}$ | $A_{11}$ |
| | 8.40807E−01 | 4.22606E−01 | −3.12443E+00 | −7.62290E−02 | −8.65233E−01 |
| | $A_{12}$ | $A_{13}$ | $A_{14}$ | $A_{15}$ | $A_{16}$ |
| | 1.18515E+01 | 1.91634E+01 | −4.97581E+01 | 8.26526E+00 | 9.65611E+00 |
| 2 | K | $A_3$ | $A_4$ | $A_5$ | $A_6$ |
| | 1.77313 | 4.67163E−02 | 2.05579E+00 | −2.15195E+00 | −3.25343E−01 |
| | $A_7$ | $A_8$ | $A_9$ | $A_{10}$ | $A_{11}$ |
| | 4.53370E+00 | −3.04617E+00 | 2.72758E+00 | 4.10609E+00 | −5.13537E+01 |
| | $A_{12}$ | $A_{13}$ | $A_{14}$ | $A_{15}$ | $A_{16}$ |
| | −2.25821E+02 | −1.55360E+01 | 1.27374E+03 | 3.52733E+03 | −7.79478E+03 |
| 4 | K | $A_3$ | $A_4$ | $A_5$ | $A_6$ |
| | 1.00000 | 0.00000E+00 | 1.06453E−01 | −1.26085E+00 | 3.19168E+00 |
| | $A_7$ | $A_8$ | $A_9$ | $A_{10}$ | |
| | −1.52412E+00 | −6.80541E+00 | 1.24574E+01 | −5.43317E+00 | |
| 5 | K | $A_3$ | $A_4$ | $A_5$ | $A_6$ |
| | 1.00000 | 0.00000E+00 | 1.00878E−01 | 6.15160E−02 | −1.02472E+00 |
| | $A_7$ | $A_8$ | $A_9$ | $A_{10}$ | |
| | 2.34889E+00 | 1.08831E+00 | −7.49129E+00 | 6.45160E+00 | |

*ASPHERIC SURFACE

In addition, Table 5 to be described later shows numerical values corresponding to the respective conditional expressions in Example 2. As shown in Table 5, the projection lens according to Example 2 is configured to satisfy all the conditional expressions (1) to (6) and (1A) to (6A).

FIG. 6 is an aberration diagram illustrating various aberrations (spherical aberration, astigmatism, distortion, and lateral chromatic aberration) of the projection lens according to Example 2. As can be seen clearly from FIG. 6, the projection lens according to Example 2 has a wide angle as the half angle of view ω is 28.8 degrees, and is fast as the F number is 2.20, in which aberrations are satisfactorily corrected.

Example 3

The projection lens according to Example 3 is configured as shown in FIG. 3. Specifically, the projection lens has substantially the same configuration as that of Example 1 mentioned above. However, there are differences in the following points. In the second lens group $G_2$, the second lens $L_2$ is formed in a biconvex shape on the optical axis Z, the fourth lens $L_4$ is formed as a biconcave lens, and each of the fourth lens $L_4$ and the fifth lens $L_5$ is formed as each single lens (the lenses are not cemented to each other).

In Example 3, the upper part of Table 3 shows radii of curvature R of the lens surfaces, center thicknesses of the lenses and air spaces D between the lenses, and refractive indices Nd and Abbe numbers νd of the lenses at the d-line. Further, the lower part of Table 3 shows respective constants K and $A_3$ to $A_{16}$ corresponding to the respective aspheric surfaces.

TABLE 3

| FOCAL LENGTH F = 1.00 | | | | |
|---|---|---|---|---|
| SURFACE | R | D | Nd | νd |
| 1* | 0.949 | 0.158 | 1.4910 | 57.6 |
| 2* | 0.396 | 1.659 | | |
| 3 (APERTURE STOP) | ∞ | 0.420 | | |
| 4* | 7.727 | 0.368 | 1.4910 | 57.6 |
| 5* | −1.169 | 1.179 | | |
| 6 | 2.785 | 0.338 | 1.6000 | 61.2 |
| 7 | −2.080 | 0.005 | | |
| 8 | −68.138 | 0.060 | 1.8000 | 25.0 |
| 9 | 1.115 | 0.216 | | |
| 10 | 1.599 | 0.331 | 1.6000 | 61.2 |
| 11 | −4.120 | 0.470 | | |
| 12 | ∞ | 1.365 | 1.5163 | 64.1 |
| 13 | ∞ | | | |

TABLE 3-continued

ASPHERIC SURFACE COEFFICIENT

| SURFACE NUMBER | | | | | |
|---|---|---|---|---|---|
| 1 | K | $A_3$ | $A_4$ | $A_5$ | $A_6$ |
| | −0.36350 | −5.16983E−02 | −9.41955E−01 | −4.21300E−01 | 3.45957E+00 |
| | $A_7$ | $A_8$ | $A_9$ | $A_{10}$ | $A_{11}$ |
| | 1.98249E−01 | −2.52801E+00 | −5.33660E+00 | 4.54411E−01 | 1.56875E+00 |
| | $A_{12}$ | $A_{13}$ | $A_{14}$ | $A_{15}$ | $A_{16}$ |
| | 1.36346E+01 | 1.89870E+01 | −4.90097E+01 | 1.49209E+01 | 5.05267E−01 |
| 2 | K | $A_3$ | $A_4$ | $A_5$ | $A_6$ |
| | 0.25020 | −1.41224E−01 | −7.02553E−01 | −2.00332E+00 | 2.69913E+00 |
| | $A_7$ | $A_8$ | $A_9$ | $A_{10}$ | $A_{11}$ |
| | 7.99458E+00 | 8.26035E−01 | −4.63836E+00 | −2.34827E+01 | −6.85232E+01 |
| | $A_{12}$ | $A_{13}$ | $A_{14}$ | $A_{15}$ | $A_{16}$ |
| | −1.58870E+02 | 1.13066E+02 | 1.02263E+03 | 2.31757E+03 | −5.41619E+03 |
| 4 | K | $A_3$ | $A_4$ | $A_5$ | $A_6$ |
| | 1.00000 | 0.00000E+00 | 1.40508E−01 | −1.10938E+00 | 3.98354E+00 |
| | $A_7$ | $A_8$ | $A_9$ | $A_{10}$ | |
| | −3.41692E+00 | −7.57438E+00 | 1.86016E+01 | −9.81159E+00 | |
| 5 | K | $A_3$ | $A_4$ | $A_5$ | $A_6$ |
| | 1.00000 | 0.00000E+00 | 1.51961E−01 | 4.67000E−02 | −9.53845E−01 |
| | $A_7$ | $A_8$ | $A_9$ | $A_{10}$ | |
| | 3.37556E+00 | 2.13635E−01 | −1.13349E+01 | 1.23288E+01 | |

*ASPHERIC SURFACE

In addition, Table 5 to be described later shows numerical values corresponding to the respective conditional expressions in Example 3. As shown in Table 5, the projection lens according to Example 3 is configured to satisfy all the conditional expressions (1) to (6) and (1A) to (6A).

FIG. 7 is an aberration diagram illustrating various aberrations (spherical aberration, astigmatism, distortion, and lateral chromatic aberration) of the projection lens according to Example 3. As can be seen clearly from FIG. 7, the projection lens according to Example 3 has a wide angle as the half angle of view ω is 29.2 degrees, and is fast as the F number is 2.20, in which aberrations are satisfactorily corrected.

Example 4

The projection lens according to Example 4 is configured as shown in FIG. 4. Specifically, the projection lens has substantially the same configuration as that of Example 1 mentioned above. However, there are differences in the following points. First, the first lens $L_1$ constituting the first lens group $G_1$ is formed in a biconcave shape on the optical axis Z. Second, in the second lens group $G_2$, the second lens $L_2$ is formed as a positive meniscus lens (a spherical lens) of which a convex surface faces toward the reduction side, the third lens $L_3$ is formed as a biconvex lens (based on the shape thereof on the optical axis Z) which is made of plastic and of which both surfaces are aspheric, and the fourth lens $L_4$ is formed as a biconcave lens. Third, the aperture stop 3 is disposed between the second lens $L_2$ and the third lens $L_3$ in the second lens group $G_2$ (near the reduction side of the second lens $L_2$).

In Example 4, the upper part of Table 4 shows radii of curvature R of the lens surfaces, center thicknesses of the lenses and air spaces D between the lenses, and refractive indices Nd and Abbe numbers vd of the lenses at the d-line. Further, the lower part of Table 4 shows respective constants K and $A_3$ to $A_{16}$ corresponding to the respective aspheric surfaces.

TABLE 4

FOCAL LENGTH F = 1.00

| SURFACE | R | D | Nd | vd |
|---|---|---|---|---|
| 1* | −1.658 | 0.210 | 1.4910 | 57.6 |
| 2* | 1.026 | 1.280 | | |
| 3 | −40.487 | 0.178 | 1.7130 | 53.9 |
| 4 | −1.561 | 0.060 | | |
| 5 (APERTURE STOP) | ∞ | 1.557 | | |
| 6* | 5.154 | 0.404 | 1.4910 | 57.6 |
| 7* | −1.463 | 0.011 | | |
| 8 | −9.178 | 0.071 | 1.8052 | 25.4 |
| 9 | 1.652 | 0.438 | 1.5891 | 61.1 |
| 10 | −2.121 | 0.720 | | |
| 11 | ∞ | 1.367 | 1.5163 | 64.1 |
| 12 | ∞ | | | |

TABLE 4-continued

ASPHERIC SURFACE COEFFICIENT

| SURFACE NUMBER | | | | | |
|---|---|---|---|---|---|
| 1 | K<br>−3.14851 | $A_3$<br>−6.61968E−02 | $A_4$<br>2.81870E+00 | $A_5$<br>−4.66732E+00 | $A_6$<br>2.98682E−01 |
| | $A_7$<br>1.65420E+00 | $A_8$<br>3.63951E+00 | $A_9$<br>1.33482E+00 | $A_{10}$<br>−9.82329E−02 | $A_{11}$<br>−1.30654E+01 |
| | $A_{12}$<br>−1.25728E+01 | $A_{13}$<br>6.09613E+00 | $A_{14}$<br>−3.42693E−02 | $A_{15}$<br>1.28975E+02 | $A_{16}$<br>−1.28972E+02 |
| 2 | K<br>−0.30846 | $A_3$<br>−2.37276E−03 | $A_4$<br>2.68695E+00 | $A_5$<br>−9.66343E−01 | $A_6$<br>−8.67820E+00 |
| | $A_7$<br>7.44644E+00 | $A_8$<br>9.67244E+00 | $A_9$<br>8.41488E+00 | $A_{10}$<br>−4.35324E+00 | $A_{11}$<br>−3.74460E+01 |
| | $A_{12}$<br>−1.10756E+02 | $A_{13}$<br>1.19027E+02 | $A_{14}$<br>4.76426E+02 | $A_{15}$<br>−1.64398E+03 | $A_{16}$<br>1.79235E+03 |
| 6 | K<br>1.00000 | $A_3$<br>0.00000E+00 | $A_4$<br>−6.79485E−02 | $A_5$<br>1.73525E−02 | $A_6$<br>−6.76742E−02 |
| | $A_7$<br>7.53160E−01 | $A_8$<br>−3.71098E+00 | $A_9$<br>6.36458E+00 | $A_{10}$<br>−3.91416E+00 | |
| 7 | K<br>1.00000 | $A_3$<br>0.00000E+00 | $A_4$<br>4.22498E−02 | $A_5$<br>1.05454E−01 | $A_6$<br>1.66447E−01 |
| | $A_7$<br>−1.13876E+00 | $A_8$<br>8.10652E−01 | $A_9$<br>1.21274E+00 | $A_{10}$<br>−1.50050E+00 | |

*ASPHERIC SURFACE

In addition, Table 5 to be described later shows numerical values corresponding to the respective conditional expressions in Example 4. As shown in Table 5, the projection lens according to Example 4 is configured to satisfy all the conditional expressions (1) to (6) and (1A) to (6A).

Figure 8:
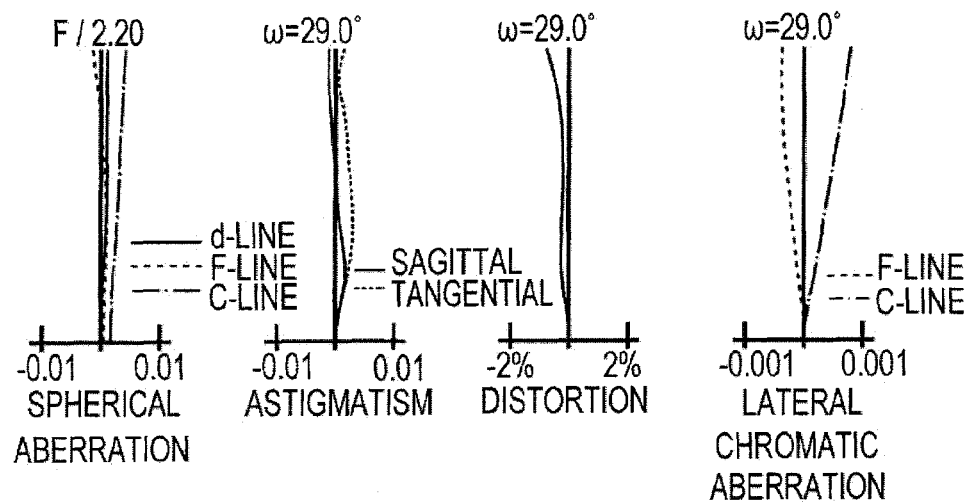
FIG. 8 is a diagram illustrating various aberrations of the projection lens according to Example 4.

FIG. 8 is an aberration diagram illustrating various aberrations (spherical aberration, astigmatism, distortion, and lateral chromatic aberration) of the projection lens according to Example 4. As can be seen clearly from FIG. 8, the projection lens according to Example 4 has a wide angle as the half angle of view ω is 29.0 degrees, and is fast as the F number is 2.20, in which aberrations are satisfactorily corrected.

TABLE 5

| CONDITIONAL EXPRESSION | (1), (1A)<br>$f_{2h}/f_w$ | (2), (2A)<br>$f_1/f_w$ | (3), (3A)<br>$f_1/f_2$ | (4), (4A)<br>$Bf/f_w$ | (5), (5A)<br>$v_n$ | (6), (6A)<br>$D_s/D$ |
|---|---|---|---|---|---|---|
| EXAMPLE 1 | 2.526 | −1.508 | −0.941 | 1.446 | 25.4 | 0.304 |
| EXAMPLE 2 | 2.940 | −1.006 | −1.225 | 1.528 | 25.4 | 0.337 |
| EXAMPLE 3 | 2.096 | −1.525 | −0.809 | 1.371 | 25.0 | 0.384 |
| EXAMPLE 4 | 2.368 | −1.259 | −0.618 | 1.622 | 25.4 | 0.393 |

What is claimed is:

1. A projection lens consisting of:
a first lens group that is formed of a single negative lens;
a second lens group that is formed of three positive lenses and a single negative lens; and
a stop, which is disposed between the first lens group and the second lens group or in the second lens group,
wherein the first lens group, which is formed of the single negative lens, and the second lens group, which is formed of the three positive lenses and the single negative lens, are arranged in order from a magnification side,
wherein the projection lens is telecentric on a reduction side,
wherein the single negative lens of the first lens group is formed to have at least one aspheric surface,
wherein in the second lens group, first and second positive lenses, each of which has a surface convex toward the reduction side, are arranged in order from the magnification side,
wherein at least one of the first and second positive lenses is formed as an aspheric lens, and
wherein the following conditional expressions (1) and (2) are satisfied:

$$1.0 \leq f_{2h}/f \leq 5.0 \tag{1, and}$$

$$-2.5 \leq f_1/f \leq -0.8 \tag{2},$$

where
$f_{2h}$ is a focal length of the aspheric lens of the first and second positive lenses of the second lens group,
f is a focal length of the whole system, and
$f_1$ is a focal length of the first lens group,
wherein the following conditional expression (6) is satisfied:

$$0.2 \leq D_s/D \leq 0.5 \tag{6},$$

where
$D_s$ is a distance on an optical axis from the reduction side surface of the single negative lens of the first lens group to the stop, and
D is a total length of the projection lens.

2. The projection lens according to claim 1, wherein the single negative lens of the first lens group and the aspheric lenses of the first and second positive lenses of the second lens group, are made of plastic.

3. The projection lens according to claim 1, wherein the following conditional expression (3) is satisfied:

$$-1.8 \leq f_1/f_2 \leq 0.2 \tag{3},$$

where
$f_2$ is a focal length of the second lens group.

4. The projection lens according to claim 1, wherein the following conditional expression (4) is satisfied:

$$1.0 \leq Bf/f \tag{4},$$

where
Bf is a back focal length of the whole system.

5. The projection lens according to claim 1, wherein the following conditional expression (5) is satisfied:

$$v_n \leq 30 \tag{5},$$

where
$v_n$ is an Abbe number of the single negative lens of the second lens group at the d-line.

6. A projection-type display apparatus comprising:
a light source;
a light valve;
an illumination optical unit that guides rays originated from the light source into the light valve; and
the projection lens according to claim 1,
wherein the rays originated from the light source are optically modulated by the light valve, and are projected on a screen by the projection lens.

* * * * *